Feb. 28, 1933.   E. S. MacPHERSON   1,899,624
VEHICLE SPRING MOUNTING
Filed May 5, 1930
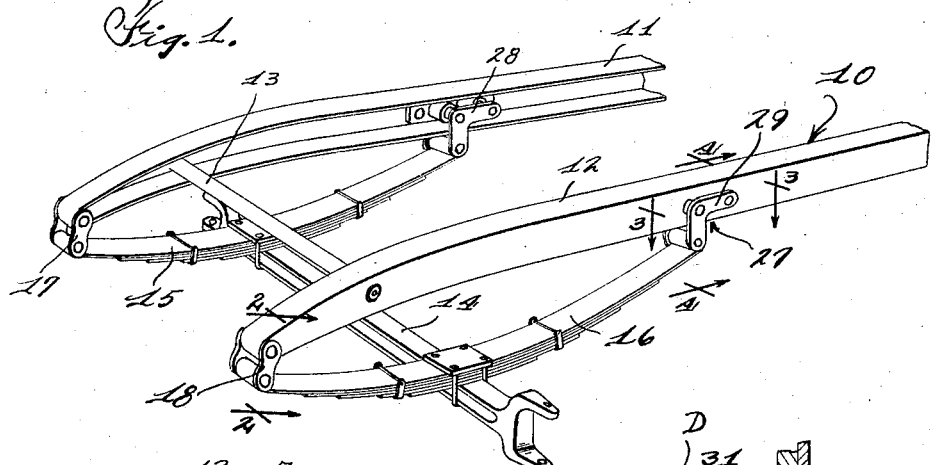
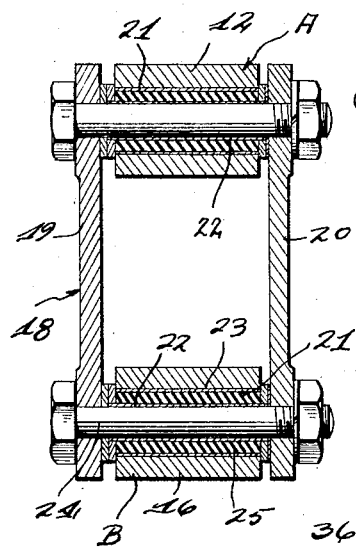
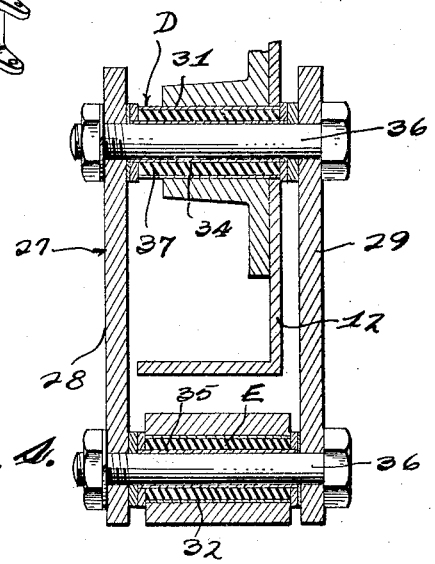
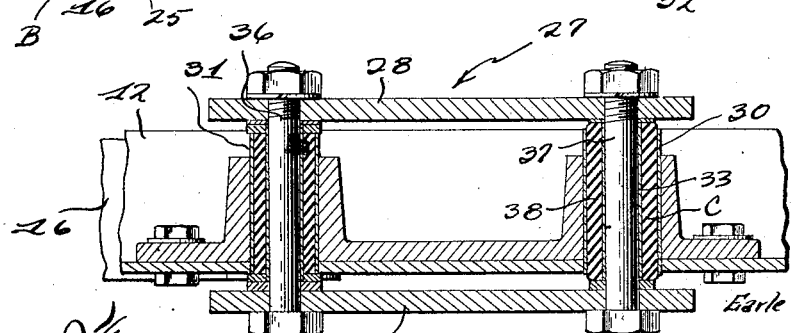
INVENTOR
Earle S. MacPherson
BY Whittemore Hulbert
Whittemore & Belknap
ATTORNEYS Patented Feb. 28, 1933

1,899,624

UNITED STATES PATENT OFFICE

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA

VEHICLE SPRING MOUNTING

Application filed May 5, 1930. Serial No. 450,019.

This invention relates generally to vehicles and more particularly to an improved mounting for the springs of a vehicle.

The present invention contemplates the provision of a mounting for supporting a spring from a vehicle chassis which permits limited longitudinal displacement of the spring relative to the chassis and thereby eliminates what is commonly known in the trade as wheel flight.

A further object of this invention is to provide a mounting of the type specified above which is simple in construction and one which may be inexpensively manufactured, assembled and installed.

With the foregoing as well as other objects in view the invention resides in the peculiar construction of the mounting and the manner in which the same functions to permit restricted longitudinal movements of a spring relative to its support.

In the drawing:

Figure 1 is a fragmentary perspective view of a vehicle chassis having springs connected thereto in accordance with the present invention.

Figure 2 is a sectional view through the front spring mounting or shackle.

Figure 3 is a perspective view of the rear spring mounting, and

Figure 4 is a sectional view taken on the line 4—4 of Figure 1.

Referring now to the drawing, it will be noted that there is illustrated fragmentarily in Figure 1 a vehicle chassis 10 comprising sill members 11 and 12 secured together in proper spaced relation to each other by means of suitable crossbars one of which being designated by the character 13. Extending transversely of the chassis substantially below the same is a front axle 14 connected to the chassis by semi-elliptical springs 15 and 16. The forward ends of the springs are preferably connected to the front ends of the sill members 11 and 12 by means of shackles 17 and 18, respectively, which may be of any suitable construction. The shackles 17 and 18, shown herein for the purpose of illustration, are of the shock absorbing type and preferably comprise complementary side plates 19 and 20 held in proper spaced relation to each other by means of shock absorbing units A and B interposed between the plates adjacent the upper and lower ends thereof. The units A and B comprise coaxially arranged inner and outer tubular members 21 and 22 normally held in assembled position relative to each other by flexible non-metallic sleeves 25 compressed within the space between the members 21 and 22. The upper tubular members 21 are held rigid upon the frame in any suitable manner while the lower members 21 are secured within the eyes 23 formed upon the front ends of the springs 15 and 16.

The complementary plates 19 and 20 are held in assembled relation by means of the shackle bolts 24 extending axially through the inner tubular members 22 and serve to clamp the latter to the plates 19 and 20. The construction is such that rocking movement of the shackles effects a corresponding rocking movement of the inner tubular members 22 relative to the other tubular members. Relative angular movements of the inner and outer tubular members is permitted without friction due to the elastic non-metallic sleeves 25, which as stated above are compressed within the space between the tubular members 21 and 22.

The rear ends of the springs 15 and 16 are connected to the chassis frame by means of my improved mounting designated generally by the reference character 27 in Figure 1. For the purpose of illustration, I have shown the mounting 27 as comprising a pair of complementary substantially L-shaped plates 28 and 29 normally maintained in proper spaced relation to each other by means of the units C, D and E. The units C, D and E comprise outer tubular socket members 30, 31 and 32 and inner tubular sleeves 33, 34 and 35 arranged similar to the inner and outer tubular members 21 and 22, hereinbefore set forth. The tubular members 31 and 32 are respectively secured to the frame and rear ends of the spring and the cooperating inner sleeves 34 and 35 are clamped to the plates 28 and 29 for rocking movement therewith by the shackle bolts 36 extending through the inner sleeves. The latter are arranged co-axially with the outer sleeves and form with the latter annular chambers within which the elastic non-metallic sleeves 37 are compressed. The above construction is identical to the construction of the shackles 17 and 18 previously described with the result that the springs 15 and 16 are permitted to move bodily longitudinally of the chassis frame.

The units C serve to restrict longitudinal movements of the springs relative to the chassis and for accomplishing this function are disposed between the plates 28 and 29 at the free ends thereof. As shown in Figure 3, the units C are similar in construction to the units D and E in that the outer tubular members 30 thereof are also secured to the frame and the inner sleeve members 33 extending therethrough are clamped to the plates 28 and 29 by the shackle bolts 37. The sleeve members 33 are maintained within the tubular spacers 30 by means of elastic sleeves 38 compressed within the tubular members 33. The elastic sleeves 38 are preferably compressed to a less degree than the elastic sleeves, hereinbefore described, so as to afford sufficient rocking movement of the mounting to permit limited longitudinal movements of the springs relative to the chassis.

Thus, from the foregoing it will be observed that I have provided means for mounting a spring upon a vehicle chassis which permits longitudinal displacement of the spring relative to the chassis and since the axle is usually rigidly secured to the springs a corresponding movement of the axle will be effected. When the above described mounting is used in connection with the springs secured to the steering axle of the vehicle, as illustrated in the present instance, the restricted movements of the spring and axle are sufficient to suppress the re-actions of the steering mechanism caused by wheel-flight.

While in describing the invention particular stress has been placed upon the association of my improved mounting with the rear ends of both of the front springs of the vehicle, it has been found by actual practice that many of the objects of this invention may be realized by associating the mounting with either end of the spring on the steering mechanism side or on both sides of the vehicle and accordingly reservation is made to make such changes in the construction as may come within the purview of the accompanying claims.

What I claim as my invention is:

1. In a vehicle, the combination with a chassis, of a spring supported from the chassis, means connecting the spring to said chassis permitting longitudinal movement of the spring relative to the chassis, said means including a lever having one end pivotally connected to one end of the spring, means for supporting the lever from the chassis including a pair of pivots connected to the lever intermediate the ends thereof and at the free end of the same, tubular members surrounding the pivots in concentric relation to the latter and supported on the frame, and elastic members compressed within the tubular members and surrounding the said pivots, the elastic members surrounding the pivot for the free end of the lever being compressed to a less degree than the other elastic member permitting limited angular movement of the lever.

2. A mounting for vehicle springs and the like comprising a pair of spaced complementary plates, members connecting the plates adjacent the ends and intermediate the ends thereof, tubular elements surrounding each of the said members, and elastic sleeves compressed within the space between the tubular elements and members permitting limited relative movement of the latter, one of the elastic sleeves being compressed to a less degree than the other sleeves.

3. In a vehicle, the combination with a chassis, of a spring supported upon the chassis, means connecting said spring to said chassis permitting longitudinal movement of the spring relative to the chassis, said means including a lever having one end pivotally connected to one end of the spring, means supporting the lever upon the frame at spaced points comprising pivots carried by the lever, and elastic sleeves carried by the frame surrounding the pivots, one of said sleeves being compressed to a less degree than the other sleeve providing for restricted rocking movement of the lever relative to the frame.

In testimony whereof I affix my signature.

EARLE S. MacPHERSON.